Figure 7:
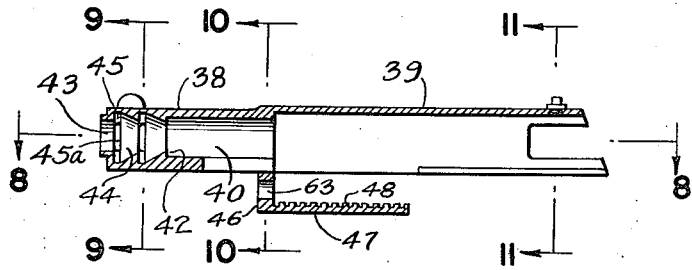
Figure 8:
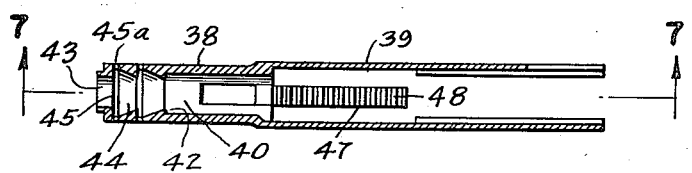
Figure 9:
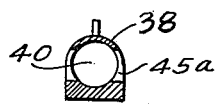
Figure 10:
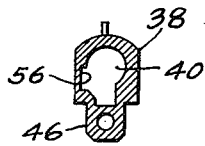
Figure 11:
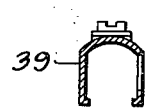
Figure 15:
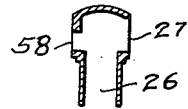
Figure 14:
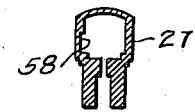
Figure 16:
Figure 13:
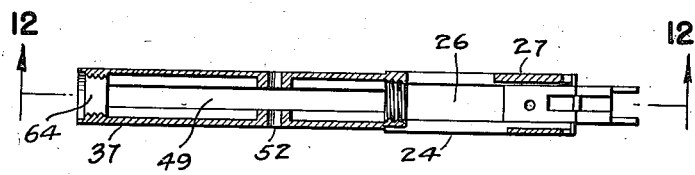

Jan. 8, 1952  J. A. ELFSTROM  2,581,395
GAS PISTON OPERATED FIREARM
Filed Oct. 25, 1949  5 Sheets-Sheet 1
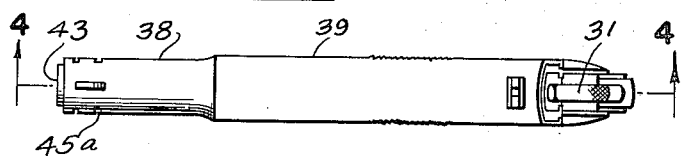
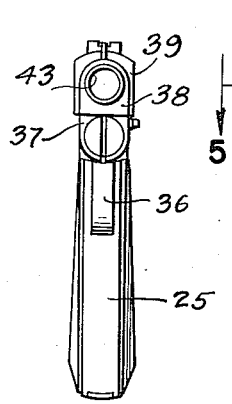
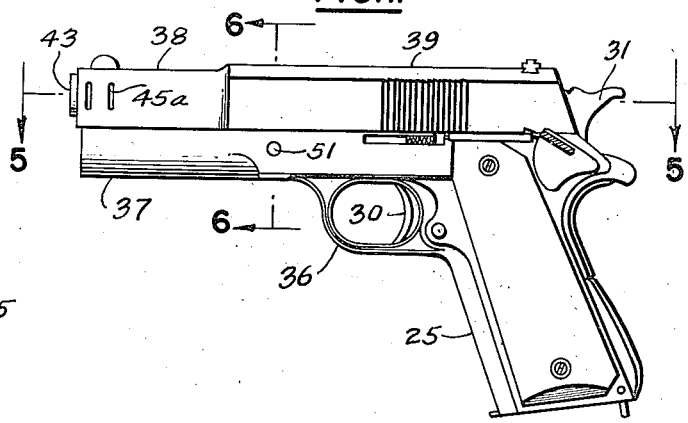
INVENTOR
BY

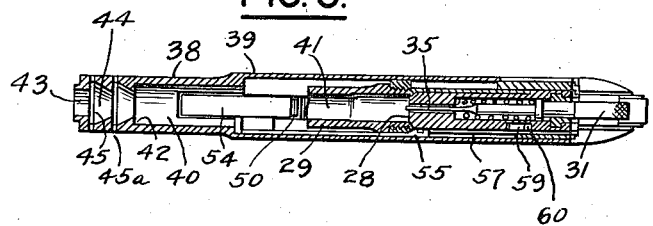
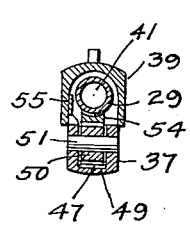
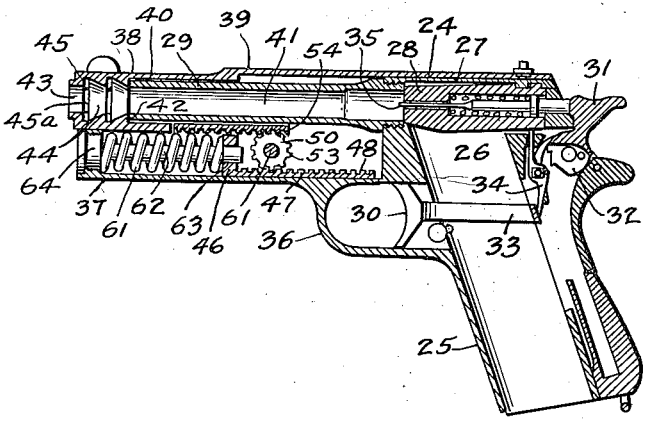

Jan. 8, 1952  J. A. ELFSTROM  2,581,395
GAS PISTON OPERATED FIREARM
Filed Oct. 25, 1949  5 Sheets-Sheet 3

Jan. 8, 1952 J. A. ELFSTROM 2,581,395
GAS PISTON OPERATED FIREARM
Filed Oct. 25, 1949 5 Sheets-Sheet 4

INVENTOR
John A. Elfstrom
BY
Ray C. Hackleigh

Jan. 8, 1952  J. A. ELFSTROM  2,581,395
GAS PISTON OPERATED FIREARM
Filed Oct. 25, 1949  5 Sheets-Sheet 5

INVENTOR.
John A. Elfstrom
BY
Roy C. Hackley Jr.

Patented Jan. 8, 1952

2,581,395

UNITED STATES PATENT OFFICE 2,581,395

GAS PISTON OPERATED FIREARM

John A. Elfstrom, Philadelphia, Pa.

Application October 25, 1949, Serial No. 123,493

1 Claim. (Cl. 89—191)

(Granted under the act of March 3, 1883, as amended April 30, 1928; 370 O. G. 757)

The invention described herein may be manufactured and used by or for the Government of the United States for governmental purposes without payment to me of any royalty thereon in accordance with the provisions of the act of April 30, 1928 (ch. 460, 45 Stat. L. 467).

This invention relates to muzzle brakes for firearms and more particularly to means for harnessing and utilizing a portion of the forces of muzzle blasts of firearms to counteract recoil forces and simultaneously to actuate reloading means.

Principles of the invention are to utilize the muzzle blast forces to counteract recoil forces and to transmit a portion of the muzzle blast forces to the breech block for actuation of shell ejecting means, cartridge reloading means and rearming firing means.

An object of the invention is to provide means for relieving the breech mechanism of conventional firearms of the compressional forces resulting from the resistance of the shoulders, or hands of the arms operator or gun support, to the rearward forces of an exploding cartridge, to thereby improve upon firing accuracy, to allow freedom of action in breech mechanism, and to relieve the latter of strain and wear occurring under such compressional and force counteracting periods.

Another object of the invention is to provide means for translating the aforementioned compressional forces upon the breech mechanism of conventional firearms into tensional forces upon mechanical means extending from harnessed pulling force on the muzzle end of the barrel to the breech block to counteract the rearward force resulting from the explosion of the cartridge.

A further object of the invention is to provide a recoil counteracting firearm with a stationary or fixed barrel with respect to the butt or stock, to thereby overcome firing inaccuracies due to floating or reciprocating barrels.

A still further object of the invention is to provide positive mechanical means, as distingushed from pneumatic, for transmitting actuating forces from the muzzle forces to the aforementioned breech ejecting, reloading and rearming mechanisms.

Figures 12, 17:
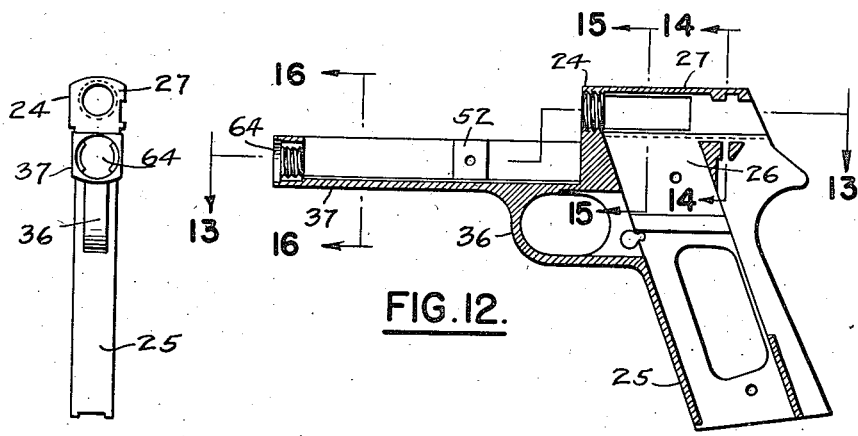
Figure 19:
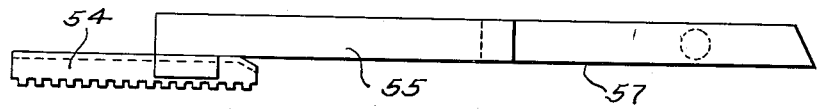
Figure 18:
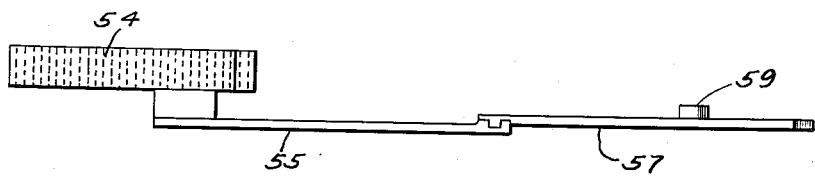
Figure 20:
Figure 23:
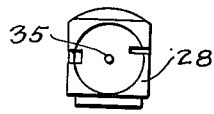
Figure 22:
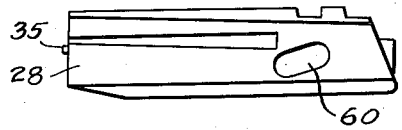
Figure 21:
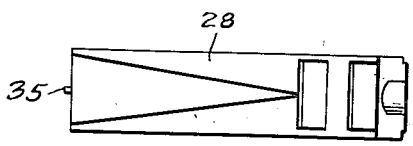

These and other objects will become obvious from the following description of embodiments of the invention and the accompanying drawings in which:

Figs. 1, 2 and 3 of the first sheet are views in side elevation, top plan, and front elevation, respectively, of an assembled pistol incorporating the invention;

Figs. 4, 5 and 6 of the second sheet are cross-sectional views on lines 4—4 of Fig. 2, 5—5 of Fig. 1, and 6—6 of Fig. 1, respectively, of the assembled pistol;

Figs. 7, 8, 9, 10 and 11 of the third sheet are cross-sectional views of the muzzle brake sleeve on lines 7—7 of Fig. 8, 8—8, 9—9, 10—10, and 11—11 of Fig. 7, respectively;

Figs. 12, 13, 14, 15 and 16 of the fourth sheet are cross-sectional views of the pistol frame and receiver on lines 12—12 of Fig. 13, 13—13, 14—14, 15—15 and 16—16 of Fig. 12; and Fig. 17 an end view of Fig. 12; and Figs. 18, 19 and 20 of the fifth sheet are views in plan, side and end elevation of the breech block rack and slide arm, respectively, and Figs. 21, 22 and 23, plan, side and end elevational views of the breech block.

For the purpose of illustrating and describing the invention, the embodiment shown and described is as adapted to an automatic pistol. It is to be understood, however, that the improvement is not limited in its application to side arms, but, within the scope of my invention, is equally adaptable to other small arms, such as shoulder arms, and mounted types of guns, such as machine guns of the field type as well as those mounted on land, air and water vehicles with turret or stationary mountings.

For an understanding of my improvements, I have illustrated the same in the drawings as applied to a side arm shown in the assembled views of Figures 1, 2 and 3 and including, as shown in Figs. 12 through 18, a gun frame 24 (see Fig. 12) having a magazine type of hand grip 25, cartridge feed passage 26, a breech casing 27 adapted to removably retain and house, as shown in Figs. 21, 22 and 23, a reciprocating breech block 28 and, as shown in Figs. 4, 5 and 6, a rigid barrel 29 threadingly secured to the breech casing 27, a trigger 30, a hammer 31, cock and half-cock means 32, trigger arm 33 and means 34 operatively associated therewith for releasing the gunlock 32, a firing pin 35 carried by the breech block 28, and a trigger guard 36 all of more or less conventional design, such as found in automatic or semi-automatic pistols except that the barrel is fixed and of the nonfloating type as may be found in revolvers, but so modified as necessary to meet the particular requirements of the particular improvements constituting my invention as described hereinafter and set forth in the appended claim.

My aforesaid improvements include a housing 37 (Figs. 1–6 and 12, 13, 16 and 17) in fixed relation to the gun frame 24 and barrel 29, adapted to house and operatively retain mechanical means, described in detail hereinafter, for transmitting muzzle blast forces to the breech block for the actuation thereof to eject the shell of a fired cartridge, reload the gun, and recock the hammer for refiring.

For positioning over the forward end of the barrel 29 I provide, as shown in Figs. 1 through 11, a muzzle brake sleeve 38 which extends rearwardly into a casing 39 over the rearward portion of the barrel, and the breech casing 27 of the gun frame in which the breech block is mounted. The sleeve portion 38 is provided with a bore 40 of a diameter slightly greater than the overall diameter of an equivalent portion of the forward end of the barrel so as to fit thereover and be slidingly guided reciprocatingly coaxial with the axis of the bore 41 of the barrel. Intermediate the ends of the sleeve portion 38 there is provided a shoulder 42 of substantially the same depth as the thickness of the walls of the end of the gun barrel and which shoulder serves as a stop for the sleeve when brought into engagement with the end of the barrel. At the shoulder 42 the bore 40 continues into a bore 43 which extends to the forward end of the sleeve portion 38. The bore 43 is preferably of the same diameter as that of the forward end of the bore 41 of the barrel and of course extends on the same axis as that of the bore of the barrel. Within the side walls of the bore 43, I provide one or more truncated cone shaped recesses 44 progressively enlarging in diameter as they extend forward and terminating at a shoulder 45 which returns to the bore 43. Gas vents 45a extend laterally from recess 44 to the exterior of the sleeve 38.

Extending downwardly from the muzzle brake sleeve 38 or its rearwardly extending casing 39 is provided an arm 46 (see Fig. 10) of such overall shape as to fit transversely within and be guided by the inner walls of the housing 37 as the arm 46 is carried forwardly and rearwardly with the movement of the sleeve 38. Extending rearwardly from the arm 46 is a gear rack 47 with gear teeth 48 upward and which slidingly sets within a channel 49 (see Fig. 16) longitudinally in the inner bottom wall of the housing 37. A pinion gear 50 is rotatably mounted upon an axle 51 carried in diametrically and transversely opposed bearings 52 in the opposite side walls of the housing 37 in a manner whereby its cogs 53 mesh with the teeth 48 of the rack 47.

As the muzzle blast forces impinge upon shoulders 45, the sleeve 38 and its rearwardly extending casing 39 are driven forward carrying arm 46 and the rack 47, the teeth 48 of which in turn rotatably drive the gear 50 which gear in turn drives a second gear rack 54 (see Figs. 18, 19 and 4). The latter gear rack 54 is mounted in parallel relationship to the rack 47 and engages the gear 50 diametrically opposite its point of engagement with the rack 47. The rack 54 by this arrangement is thereby driven rearwardly by the gear 50 as it is caused to rotate by the forward movement of rack 47.

The rack 54 is carried by a slideable arm 55 (Figs. 5, 6, 18 and 19) which in turn is slidingly carried in a longitudinal channel 56 (Fig. 10) in the inner side wall of the sleeve 38 and casing 39. The slide arm 55 engages, at its rearward end, the forward end of a breech block slide arm 57 slidingly carried in a longitudinal channel 58 (Figs. 14 and 15) in the inner face of the breech casing 27 of the gun frame. Extending from the face of the arm 57 is a lug 59 which engages the breech block by extending into an oblong recess 60 in the side of the block 28.

As has been pointed out the sleeve 38 is driven forward by gas compression within the recess 44 and the breech block is driven rearwardly by the above-described means, and in order to return the sleeve into abutment with the end of the barrel and pull the breech block back into rearmed position, I provide actuating or driving means such as a coil spring 61 (Fig. 4) mounted upon a centering or guiding shaft 62 fixed at one end to the forward end of the casing 37. The other end of the shaft 62 is slidingly retained in position by extending into a bearing 63 (Fig. 7) in the arm 46. During the forward thrust of the sleeve 38 the spring 61 is compressed between the arm 46 and the closure means 64 in the forward end of the casing 37 and as the compressional forces of the gases impinged within the recess 44 are released through the vents 45a and open end 43 of the sleeve 38 the spring 61 drives the arm 46 and sleeve 38 rearward, the rack 47 in turn drives the gear 50, which in turn drives the second rack 54 forward, and through the arms 55 and 57 and lug 59 the breech block is pulled back into rearmed position.

From the foregoing it will be understood that my improvements provide for positive mechanical means, actuated by muzzle blasts, for arming and rearming a gun and for simultaneously counteracting recoil forces whereby to improve firing accuracy and eliminate compressional strains on the breech mechanism of the gun.

Having described my invention and illustrated embodiments whereby the same may be practiced, what I claim is:

In combination with a magazine type firearm provided with a gun frame, a hand grip, a barrel rigidly fixed to said frame, a hammer, a trigger for releasing said hammer, a trigger guard and a firing pin, the improvement which comprises a housing, a muzzle brake sleeve, a reciprocative breech block provided with a lateral recess making an acute angle with the direction of reciprocation of said block, a muzzle brake sleeve provided with a bore for the muzzle of said barrel and a plurality of annular shoulders each opening into an outwardly coned recess having a plurality of radial gas vents, a terminal shoulder opening into a terminal bore, a radially extending arm provided with a shaft bearing, a gear rack rigidly secured to said arm, a pinion operatively engaged with said rack, a second rack also operatively engaged with said pinion, a slidable arm connected with said second rack, a breech block slide arm provided with a lug for operative engagement in the recess of said breech block, a compression spring coil for returning said breech block to initial position and a shaft for said spring mounted in said bearing.

JOHN A. ELFSTROM.

REFERENCES CITED

The following references are of record in the file of this patent:

UNITED STATES PATENTS

| Number | Name | Date |
|---|---|---|
| 636,196 | Burgess | Oct. 31, 1899 |
| 684,173 | Bjerkness | Oct. 8, 1901 |
| 811,595 | Taylor | Feb. 6, 1906 |
| 1,195,307 | Wheatley | Aug. 22, 1916 |
| 1,377,236 | Watson | May 10, 1921 |

FOREIGN PATENTS

| Number | Country | Date |
|---|---|---|
| 588,951 | France | Feb. 12, 1925 |